US009870694B2

(12) United States Patent
Eyring et al.

(10) Patent No.: US 9,870,694 B2
(45) Date of Patent: Jan. 16, 2018

(54) NETWORKED SECURITY CAMERAS AND AUTOMATION

(71) Applicant: Vivint, Inc., Provo, UT (US)

(72) Inventors: Matthew J. Eyring, Provo, UT (US); Jeffrey David Whitlock, Provo, UT (US); Thomas Colby Winegar, Draper, UT (US); Kyle Lefebvre, Orem, UT (US); Tyson Chapman, Sandy, UT (US); Jungtaik Hwang, Draper, UT (US); Clint Huson Gordon-Carroll, Highland, UT (US)

(73) Assignee: Vivint, Inc., Provo, UT (US)

(*) Notice: Subject to any disclaimer, the term of this patent is extended or adjusted under 35 U.S.C. 154(b) by 0 days.

(21) Appl. No.: 15/160,979

(22) Filed: May 20, 2016

(65) Prior Publication Data
US 2017/0337805 A1    Nov. 23, 2017

(51) Int. Cl.
G08B 13/00       (2006.01)
G08B 25/00       (2006.01)
G08B 13/196      (2006.01)
H04L 29/08       (2006.01)

(52) U.S. Cl.
CPC ....... G08B 25/006 (2013.01); G08B 13/1968 (2013.01); G08B 13/19691 (2013.01); H04L 67/12 (2013.01); H04L 67/306 (2013.01)

(58) Field of Classification Search
CPC ............................ G08B 25/006; G08B 13/00
USPC ........ 340/565, 541; 348/143, 152, 153, 154, 348/155, 208.15, 208.12; 382/103
See application file for complete search history.

(56) References Cited

U.S. PATENT DOCUMENTS

| 5,164,827 | A  | * | 11/1992 | Paff ................. G08B 13/19608 348/143 |
| 7,760,109 | B2 | * | 7/2010 | Broad ................ G08B 25/009 340/286.02 |
| 8,386,615 | B2 |  | 2/2013 | Clark et al. |
| 9,060,074 | B2 |  | 6/2015 | Wagner et al. |
| 2008/0100705 | A1 |  | 5/2008 | Kister et al. |
| 2008/0238668 | A1 | * | 10/2008 | Johnsen ................ G08B 25/10 340/541 |
| 2011/0058034 | A1 |  | 3/2011 | Grass |
| 2011/0257985 | A1 |  | 10/2011 | Goldstein |
| 2012/0124203 | A1 |  | 5/2012 | Richards |

(Continued)

OTHER PUBLICATIONS

User's Manual, Ring Video Doorbell, https://static.ring.com/assets/static/RING-Users-Manual-18214878ad7f1946e58d9efd0d919.pdf, Bot Home Automation, Inc., Mar. 21, 2016.

(Continued)

Primary Examiner — Toan N Pham
(74) Attorney, Agent, or Firm — Holland & Hart LLP

(57) ABSTRACT

Apparatuses, techniques, and methods for a security and/or automation system are described. In some cases, methods may include obtaining data from a first sensor at a first location, receiving identification data related to a person or an event at the first location; comparing the obtained data with the identification data, adjusting a first security action at the first location based at least in part on comparing the received data with the obtained data, and transmitting information to a second sensor at a second location different from the first location based at least in part on the determining, the second sensor being part of a predetermined group of devices.

20 Claims, 8 Drawing Sheets

(56) References Cited

U.S. PATENT DOCUMENTS

| | | |
|---|---|---|
| 2012/0257061 A1 | 10/2012 | Edwards et al. |
| 2013/0009749 A1 | 1/2013 | Vijayaraghavan et al. |
| 2014/0266681 A1* | 9/2014 | Dunn .................. G08B 26/00 340/517 |
| 2015/0022355 A1 | 1/2015 | Pham et al. |
| 2015/0054639 A1 | 2/2015 | Rosen |
| 2015/0070506 A1 | 3/2015 | Chattopadhyay et al. |
| 2015/0098686 A1 | 4/2015 | Obukhov et al. |
| 2015/0145991 A1 | 5/2015 | Russell et al. |
| 2015/0339912 A1 | 11/2015 | Farrand et al. |
| 2016/0094810 A1 | 3/2016 | Mirza et al. |
| 2016/0173827 A1 | 6/2016 | Dannan et al. |
| 2016/0286135 A1 | 9/2016 | Baseuny |
| 2017/0019644 A1 | 1/2017 | K V et al. |

OTHER PUBLICATIONS

PCT International Search Report for International Application No. PCT/US2017/028507, dated Jul. 25, 2017 (3 pages).

\* cited by examiner

NETWORKED SECURITY CAMERAS AND AUTOMATION

BACKGROUND

The present disclosure, for example, relates to security and/or automation systems, and more particularly to networked security cameras and related automation.

Security and automation systems are widely deployed to provide various types of communication and functional features such as monitoring, communication, notification, and/or others. These systems may be capable of supporting communication with a user through a communication connection or a system management action. Some automated systems may be programmed to enable security cameras to send data to or receive data from a device linked in a network.

SUMMARY

Multiple audio or video devices, such as security cameras may be networked together to receive and transmit data related to the location and/or the association of the devices. In some examples, the network of devices may be created and maintained based on a predetermined proximity of the devices or a device to a location, such as devices associated with a house or houses in a neighborhood. In other examples, the network of devices may be based on each device's association with a group, such as a community network, or a group of devices running the same software application.

The devices may obtain and receive data related to the presence of people and/or objects or occurrence of events, obtain and receive data related to identifying the people, objects, and/or events, and make a determination as to whether an action should be taken. The action may be an action related to user preferences at a home and the action may be a security action. In addition, one device in a networked group may share the data, request data, and request initiation of actions with and to other devices in the networked group.

Some examples relate to systems, methods, non-transitory computer readable media and related devices for enhancing security and home automation system components and communications. In one example, the system and method may include obtaining data from a first sensor at a first location, receiving identification data related to a person or an event at the first location, comparing the obtained data with the identification data, adjusting a first security action at the first location based at least in part on comparing the received data with the obtained data, and/or transmitting information to a second sensor at a second location different from the first location based at least in part on the determining, the second sensor being part of a predetermined group of devices.

The system and method may further include detecting an event at the first location based on the obtained data, the received identification data, or both, classifying the event at the first location based on the detecting, and/or sending a request to a second device at the second location based at least in part on the classification. In yet further examples, the method may include determining an indication of occupancy at the first location and adjusting the first security action based on the indication of occupancy.

In some examples, the system and method may further include transmitting a first request to a device at the second location to determine an indication of occupancy at the second location, and/or transmitting a second request to adjust a second security action at the second location based at least in part on the determined indication of occupancy at the second location.

In some examples, adjusting may include sending a request to a device at the second location to obtain data, sending a command to adjust a second security action at the second location based at least in part on the comparing at the first location, and/or adjusting the first security action at the first location based at least in part on a user profile associated with the first location.

In some examples, the system and method may further include transmitting an instruction to variably adjust a second security action at the second location based at least in part on the adjustment of the first security action at the first location.

In some examples, the transmitted information may include transmitting an instruction to variably adjust a second security action at the second location based at least in part on a user profile associated with the second location.

In some examples, the system and method may further include receiving identification data from a remote source, and determining an identity of the person based at least in part on the received identification data from the remote source and the comparing.

In some examples, receiving data may include receiving identification data from a database associated with the predetermined group. In some examples, the method may include identifying the predetermined group of devices based on a user input.

In some examples, the system and method may include defining the predetermined group of devices based at least in part on a geographic proximity of the first location to the second location, wherein the first location and the second location are in different physical structures.

In some examples, adjusting the first security action includes increasing a frequency of obtaining audio data or visual data, activating an internal light, or an external light, or an internal audio source, or an external audio source, or a lock, or some combination thereof.

In some examples, the system and method may further include sending an alert to a user device associated with the first location based at least in part on the received data, receiving an indication from the user based on the sent alert, and adjusting a security action at the first location based at least in part on the received indication.

The foregoing has outlined rather broadly the features and technical advantages of examples according to this disclosure so that the following detailed description may be better understood. Additional features and advantages will be described below. The concepts and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

The systems and methods described herein relate generally to receiving and transmitted identification and event data at an audio/video device, such as a security camera. In some examples, the device may be wirelessly networked with other devices within a predetermined distance or at a predetermined location. In other examples, the devices may be wirelessly networked with other devices that have opted-into a community networking group. Based on the data received and/or transmitted, the devices may send commands to other devices to take an action, send an alert, perform other operations.

In one embodiment, two or more security cameras may be associated with two or more locations, respectively. One camera at one location may obtain and receive data related to identification of people, objects, and/or events occurring at or near the location. Based on the relationship between the two or more cameras, the first camera may share information, request information, take an action at the first location, and/or request or initiate an action at the second location. Information obtained may be analyzed to determine if a person, object, and/or event requires an alert and/or an action with regard to at least one of the locations.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
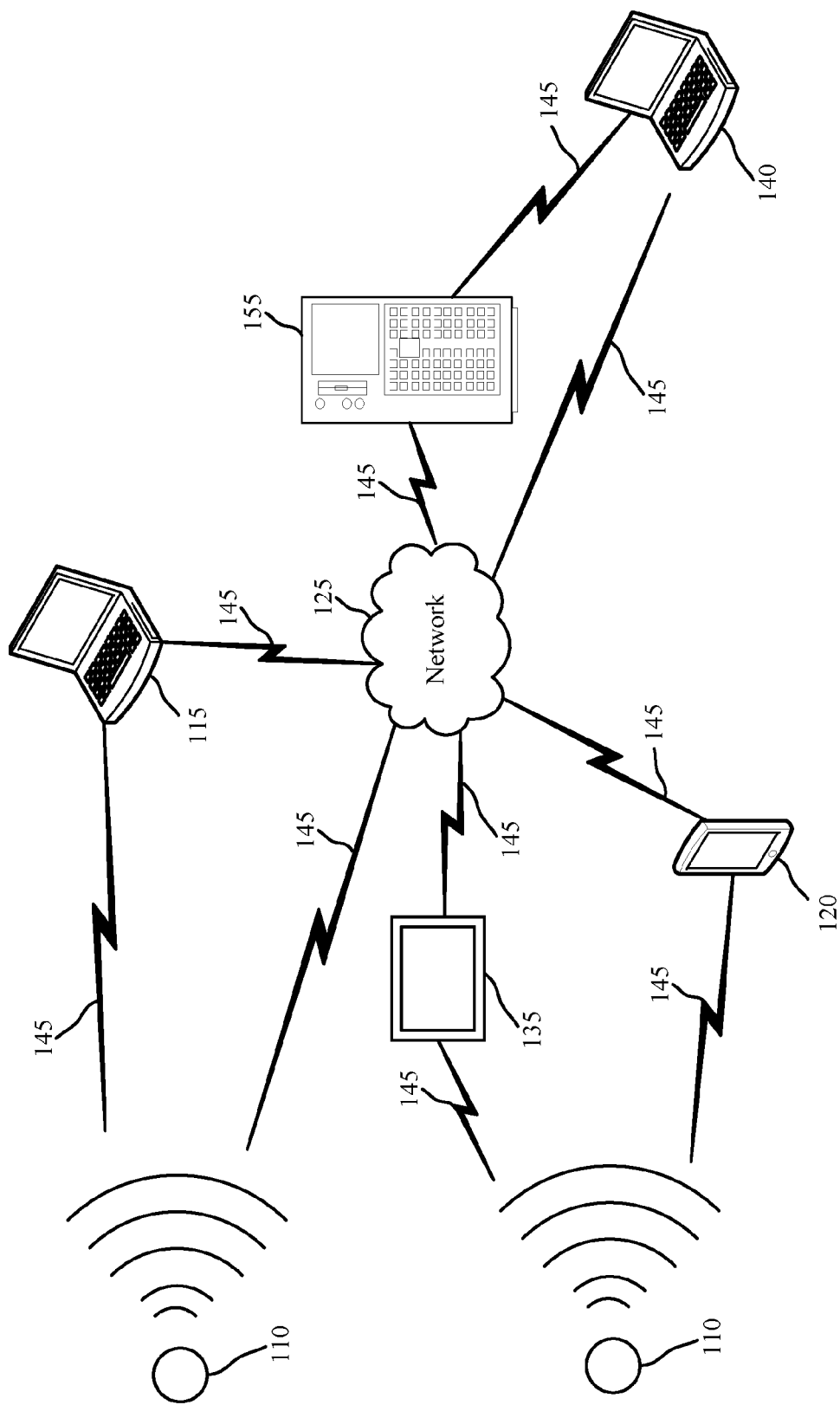
FIG. 1 shows a block diagram relating to a security and/or an automation system, in accordance with various aspects of this disclosure.

FIG. 1 is an example of a communications system 100 in accordance with various aspects of the disclosure. In some examples, the communications system 100 may include one or more sensor units 110, local computing devices 115 and 120, network 125, server 155, control panel 135, and remote computing device 140, among other components. One or more sensor units 110 may communicate via wired or wireless communication links 145 with one or more of the local computing devices 115 and 120, or network 125. The network 125 may communicate via wired or wireless communication links 145 with the control panel 135 and the remote computing device 140 via server 155. In alternate examples, the network 125 may be integrated with any one of the local computing devices 115 and 120, server 155, or remote computing device 140, such that separate components are not required.

Local computing devices 115 and 120 and remote computing device 140 may be custom computing entities configured to interact with sensor units 110 via network 125, and in some examples, via server 155. In other examples, computing devices 115 and 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a smart watch, a fitness tracker, a mobile phone, a personal digital assistant (PDA), and/or any other suitable device operable to send and receive signals, store and retrieve data, and/or execute modules. In some examples, local computing devices 115 and 120 and/or remote computing device 140 may comprise or be coupled to internal and/or external sensors which are enabled to sense and capture data similar to or in the same manner as sensors 110.

Control panel 135 may be a smart home system panel, for example, an interactive panel permanently or removably mounted on a wall in a user's home. Control panel 135 may be in direct communication via wired or wireless communication links 145 with the one or more sensor units 110, or may receive sensor data from the one or more sensor units 110 via local computing devices 115 and 120 and network 125, or may receive data via remote computing device 140, server 155, and network 125.

The local computing devices 115 and 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing devices 115 and 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor)

associated with executing an application, such as, for example, receiving and displaying data from sensor units 110.

The processor of the local computing devices 115 and 120 may be operable to control operation of the output of the local computing devices 115 and 120. The output may be a television, a liquid crystal display (LCD) monitor, a cathode ray tube (CRT) monitor, speaker, tactile output device, and/or the like. In some examples, the output may be an integral component of the local computing devices 115 and 120. Similarly stated, the output may be directly coupled to the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115 and 120 to the output.

The remote computing device 140 may be a computing entity operable to enable a remote user to monitor the output of the sensor units 110. The remote computing device 140 may be functionally and/or structurally similar to the local computing devices 115 and 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some examples, the one or more sensor units 110 may be sensors configured to conduct periodic, continuous, conditional, or otherwise ongoing automatic measurements related to determining the presence of at least one person in or at a location and/or determining data related to identifying the person determined to be present in the location. In other examples, the sensors may be configured to conduct periodic, continuous, conditional, or otherwise ongoing automatic measurements related to determining the occurrence of an event or a condition within a predetermined distance of the location or at the location. For example, the sensors may determine if a car is speeding by on the street in front of a home, if a person has entered into a house, if items are being removed from a house, etc. Sensor units 110 may include or relate to, but are not limited to: proximity, motion, temperatures, humidity, sound level, smoke, structural features (e.g., glass breaking, door opening and/or closing, window opening and/or closing, window position, door position), time, geo-location data of a user and/or a device, distance, biometrics, weight, speed, direction, gait, height, size, preferences, light, darkness, weather, time, system performance, the status and/or the usage of an electronic device and/or a building feature, and/or other inputs that relate to a security and/or an automation system and/or an occupant of an area and/or a structure, such as a home. Each sensor unit 110 may be capable of sensing one or more environmental parameters, or alternatively, separate sensor units 110 may monitor separate environmental parameters. For example, one sensor unit 110 may measure ambient light level, while another sensor unit 110 (or, in some examples, the same sensor unit 110) may detect motion of an occupant. Such detecting motion may in some examples occur in relative darkness and/or involve wavelengths within and/or beyond those detectable by the human vision (e.g., near-infrared illumination, microwave radiation, ultrasonic waves, passive infrared radiation, tomographic motion). One sensor unit 110 example may be a camera. In some examples, one or more sensor units 110 may additionally monitor alternate environmental parameters, such as the voice of an occupant.

Each sensor unit 110 may be capable of sensing multiple identification and/or event identifying parameters, or different sensor units 110 may be capable of sensing a specific identification and/or event parameter. For example, one sensor unit 110 may measure biometric data, while another sensor unit 110 (or, in some examples, the same sensor unit 110) may detect digital and/or electronic data, a physical characteristic of the person, or a location of a different person. In some examples, one or more sensor units 110 may additionally monitor alternate environmental parameters, such as the date, time, and/or weather. In alternate examples, a user may input identification data directly at the local computing devices 115 and/or 120 or at remote computing device 140, such as an allowed and/or expected user entering or exiting a building associated with the networked devices.

Data gathered by the one or more sensor units 110 may be received by local computing devices 115 and 120, which may be, in some examples, a thermostat or other wall-mounted input/output smart home display. In other examples, local computing devices 115 and 120 may be a personal computer or portable electronic device such as a smart phone, tablet, and/or smartwatch. The local computing devices 115 and 120 may process the data received from the one or more sensor units 110 to obtain presence data, identification data, and/or event data and to determine whether to store and/or share (e.g., with other networked devices or a third-party source) the data, alert a user, and/or take an action in response to obtaining the data or otherwise receiving data related to presence, identification, and/or an event. In alternate examples, remote computing device 140 may process the data received from the one or more sensor units 110, via network 125 and server 155, to obtain presence, identification and/or event data. Data transmission may occur via, for example, frequencies appropriate for a personal area network (such as BLUETOOTH® or IR communications) or local or wide area network frequencies such as, but not limited to, radio frequencies specified by the IEEE 802.15.4 standard.

In some examples, local computing devices 115 and 120 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some examples, a user may access the functions of local computing devices 115 and/or 120 from remote computing device 140. For example, in some examples, remote computing device 140 may include a mobile application that interfaces with one or more functions of computing devices 115 and/or 120. In some examples, remote computing device 140 may be a personal computer (e.g., desktop and/or laptop), control panel, smart phone or smart watch, and/or tablet. In other examples, remote computing device 140 may be a computing device associated with a business, public service, and/or database such as a news source, law enforcement, hospitals, schools, traffic cameras, Amber Alerts, criminal databases, etc.

The server 155 may be configured to communicate with the sensor units 110, the local computing devices 115 and 120, the remote computing device 140 and control panel 135. The server 155 may perform additional processing on signals received from the sensor units 110 or local computing devices 115 and 120, or may simply forward the received information to the remote computing device 140 and control panel 135.

Server 155 may be a computing device operable to receive data streams (e.g., from sensor units 110 and/or local computing devices 115 and 120 or remote computing device 140), store and/or process data, and/or transmit data and/or data summaries (e.g., to remote computing device 140). For example, server 155 may receive a transmission of or a stream of identification data from any of a number of sensor units 110. In some examples, server 155 may "pull" the data, e.g., by querying the sensor units 110, the local computing devices 115 and 120, and/or the control panel 135. In some examples, the data may be "pushed" from the sensor units 110 and/or the local computing devices 115 and 120 to the server 155. For example, the sensor units 110 and/or the local computing devices 115 and 120 may be configured to transmit data as it is generated by or entered into that device. In some instances, the sensor units 110 and/or the local computing devices 115 and 120 may periodically transmit data (e.g., as a block of data or as one or more data points).

The server 155 may include a database (e.g., in memory) containing identification data received from the sensor units 110 and/or the local computing devices 115 and 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

In one example, sensors 110 may be associated with at least two networked locations; for example, sensors 110 may be security cameras located at a first house and a second house. The sensors 110 may, respectively, be in wireless communication with a control panel and local computing devices located at the first house and/or the second house, where the control panels and computing devices of each house are in communication with each other. Remote computing device may be a computing device associated with law enforcement, a news source, or other information source from which sensors 110 and local computing devices 115 and/or 120 may receive identification information. Based at least in part on what data the sensors 110 obtain at the houses and the data received from other elements of the wireless communication system, actions at least one of the locations may be adjusted or initiated.

Figure 2:
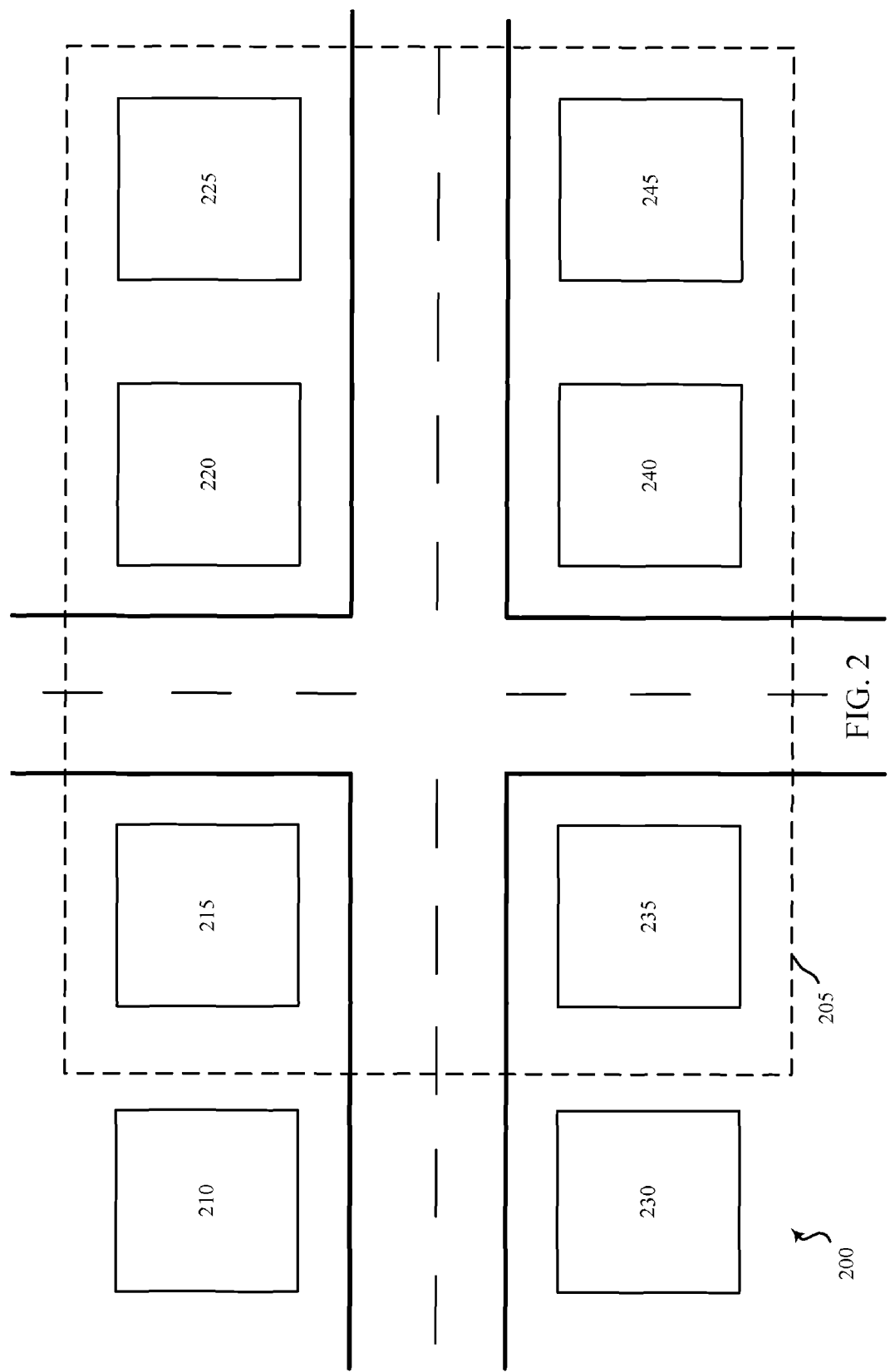
FIG. 2 shows a block diagram relating to a security and/or an automation system, in accordance with various aspects of this disclosure.

FIG. 2 shows a block diagram relating to a security and/or an automation system, in accordance with various aspects of this disclosure. In particular, FIG. 2 shows an example residential neighborhood 200 having eight houses 210, 215, 220, 225, 230, 235, 240 and 245. Although FIG. 2 shows an example residential neighborhood with houses located within a geographic area of one another, it should be understood that neighborhood 200 may be a residential area, a commercial area, a rural area, and/or a mixed use area. In addition, the houses 210-245 may be any type of structures, and the structures need not be located next to one another, but rather may be located in different geographic locations separated by any contemplated distance (e.g., same sub-division, same commercial block, same multi-unit building, different sub-divisions, different commercial blocks, located on the same street but separated by one or miles). The systems and methods described herein relate to the example residential neighborhood 200, but the system and methods are not limited to neighborhood 200.

In neighborhood 200, any of the eight houses 210-245 may be coupled to at least one audio/video device, such as a security and/or doorbell camera in wireless communication with at least one audio/video device located at another house; however, not all the devices may be in wireless communication with each other. Dotted line 205 shows a grouping of houses which are wirelessly networked to communicate with at least one other house located within the dotted line 205 by way of at least one audio/video device located at and/or associated with houses 215, 220, 225, 230, 235, 240, and/or 245. In this example, the six houses that are in networked wireless communication with each other are shown to be next to one another, however, the networked houses need not be next to each other. For example, houses 215, 220, 240, and 245 may be wirelessly networked in another example. In another example, any or some of the houses shown in within dotted line 205 may also be in wireless communication with a house (e.g., based on a device associated with and/or located at a house communicating with a device associated with a second house) that is not shown in FIG. 2.

Thus, in one example, the devices and/or houses may be part of a network based on proximity within a location; however, in other examples, the devices may be part of a network based on a specific association. For example, a community network may include a neighborhood-based social network, a social group network, an opt-in network that is not proximity based, an opt-in network that is proximity based, an automatically established network link based on location and proximity (e.g., portable electronic device running an application enters a building enabled to perform the methods described herein). For example, houses 215, 220, 225, 235, 240, and 245 may all be part of a homeowners' association, where houses 210 and 230 are not part of the same homeowners' association, even though houses 210 and 230 are located in the same neighborhood.

Each of the devices associated with the location of each of the houses may share any or all of the same capabilities as each other device. For example, a device associated with house 215 may be enabled to obtain data from a first sensor at house 215. The sensor may be physically integrated as part of the device and/or may be in wired and/or wireless communication with the device. The data obtained by the sensor may include: biometric and personal data such as fingerprints, retinal scans, facial scans, gait, height, weight, speed, cadence, hair color, hair length, presence of facial hair, tattoos, piercings, jewelry, clothing style, clothing color, voice recordings, personal identification numbers, radio frequency data related to a radio frequency identification (RFID) tag associated with a person, identification of an electronic device such as a smartphone, table, or wearable electronic device, and the like.

The sensor may also obtain data related to animals, vehicles, environment, and non-tangible items, such car types, delivery vehicles, company logos, identification card data, rain, wind, sounds related to walking, running, talking, screaming, laughing, wind, glass breaking, doors opening and closing, sirens, alarms, etc. which are determined to be within a predetermined proximity of example house 215.

In addition, the device may receive identification data related to a person or an event at or within a predetermined distance of example house 215. For example, with respect to a person, the device may associate or compare the data obtained from the sensor with a plurality of user profiles associated with house 215 or past data. In other examples, the user profiles may be associated with other houses in the neighborhood which are in networked communication with one another. The user profiles may be profiles of an allowed and/or expected users and/or guests at example house 215, or other networked houses. The user profiles may be stored individually for each house and/or combined into a database for some and/or all of the networked devices. Some profiles, sensor data, determinations, comparisons, or other information may be shared with some devices with user permission or based on user preferences. For example, in the case of an emergency or a detected event, more profile data may be shared with more of the networked devices within the area indicated by dotted line 205. If the user interacts with the system using a software application (such as on a smartphone or a control panel), the software application may query the user on what, if any, information the user would like to share with the rest of the networked users.

Other identification data related to a person may include data received from transmissions from other devices (e.g., 220, 225, 235, 240, and/or 245). In other examples, other identification data related to a person may be received from remote and/or third-party databases and/or reports and/or broadcasts and/or publications. For example, identification data from a criminal database, missing child and/or persons database, newspaper articles, news broadcasts, radio broadcasts, television broadcasts, digital streaming broadcasts, and the like.

With respect to an event, the device may associate the data obtained from the sensor with predetermined, pre-stored, and/or computer learning algorithmic determined elements related to one or more events. For example, the device may obtain information related to opening and closing a door, window, gate, garage door, blinds; a vehicle ignition starting, turning off, speeding, idling, swerving, crashing; weather data such as rain, wind, snow, hail; glass breaking; talking, screaming, laughing, etc., located within a predetermined distance of example house 215. Based on the data received, user input, changes in preferences, and/or communication from and between other devices, each device may learn the association between obtained data and/or identification data which may not have been previously predetermined or preprogrammed into the system.

The device may compare the data obtained with identification data received to determine if an event has occurred and/or if an identified or non-identified person is associated with the event. In some examples, the person and/or the event may be allowed and/or expected, while in other examples, the person and/or the event may be unauthorized. In other examples, the person and/or event may not be able to be determined and/or identified; however, through computer learning algorithms and other input, over time, the device may be able to identify people and/or events over time.

Based on the comparison, the device may initiate an adjustment of an action related to the location and/or a user associated with the location. In some examples, the adjustment may be of a user preference (e.g., turn on the lights, turn on music, set the thermostat to a specific temperature). In other examples, the adjustment may be to a security action. The adjustment may be automatic (i.e., pre-programmed by a security company, law enforcement, the manufacturer), may be user-defined (i.e., based on user preference), and/or may be dynamically adjusted and learned over time based on computer learning algorithms In addition, the device may send the obtained data, the identification data, the comparison data, data associated with the adjustment, etc., to at least one of the other devices in networked communication with the device at house 215.

Figure 3:
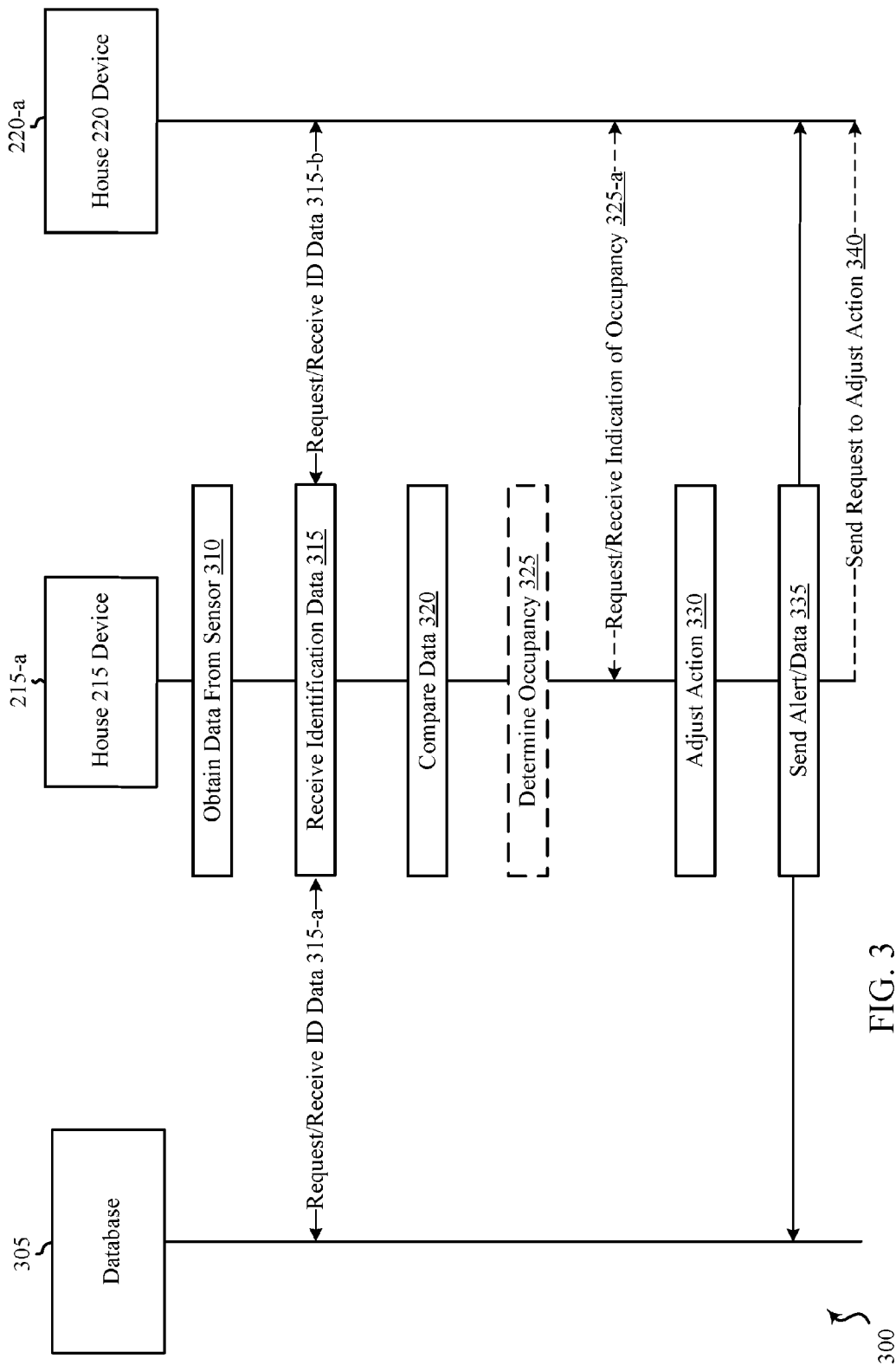
FIG. 3 shows a communication flow diagram between multiple devices relating to a security and/or an automation system, in accordance with various aspects of this disclosure.

FIG. 3 shows a communication flow diagram between multiple devices relating to a security and/or an automation system, in accordance with various aspects of this disclosure. In the example of FIG. 3, house 215 and house 220 are located in the same neighborhood, and are located across the street from one another. Both house 215 and house 220 are associated with a networked group of devices that are in wireless communication with one another (e.g., as shown by the example area within dotted line 205 described with reference to FIG. 2). House 215 may be associated with a security camera, such as a doorbell camera, an external security camera, or other monitoring device 215-a. In some examples, device 215-a may comprise internal sensors; however, in other examples, device 215-a may be communicatively and/or electrically coupled to external sensors. Likewise, house 220 may be associated with a device 220-a. Devices 215-a and 220-a may be networked together in wireless communication—directly or indirectly. In addition, both or either of device 215-a and/or device 220-a may communicate with a local and/or remote database 305.

In one example, example, device 215-a is an external camera located at house 215. The device 215-a may have a wide field of view and is thus capable of capturing a wide area in front of and to the side of house 215, as well as across the streets and next door (e.g., the device 215-a may be configured to enable a 180+ degree view around the axis of the device lens). For example, in reference to FIG. 2, device 215-a may have a full and/or partial view of at least some of the area in front of house 210, 230, 235, 240, 220, as well as the streets that intersect in the middle.

In addition, device 215-a is in communication with a control panel and/or database 305. Database 305 may be an example of a local database associated with house 215; for example, stored in memory on a control panel or other local computing device (e.g., smartphone, desktop at the location, a remote server or account associated with house 215). This local database may store information related to users associated with house 215 and each user's preferences. For example, there may be a father, mother, a daughter, a son, and a dog at house 215. The database may store identification information about each user, including the dog, as well as information about schedules, vehicles, preferences (e.g., lighting, sound, security levels). In addition, the database may store identification information about frequency and/or allowed and/or expected guests (e.g., extended family, friends, nanny, delivery people, neighbors). In another example, database 305 may be a database associated with house 220, thus, device 215-a may also be in communication with a database associated with house 220, where the house 220 database stores similar information about the users associated with house 220. In addition, houses 215 and 220 may have a shared database of similar information. In another example, database 305 may be a remote database or a third-party database which stores and shares information related to events and identification, such as a news source, law enforcement, missing persons databases, criminal databases, emergency alert systems, weather databases, and the like.

In one example, device 215-a obtains data from one or more sensors located at house 215 (block 310). In this example, the data obtained includes information indicating that the users of house 215 are scheduled to be out of the house based on their stored schedules (e.g., schedule information, activity information), the dog out with the dog walker (e.g., location information), a video of a woman approximately 5' 11" tall, dressed in black, and with blonde hair (e.g., physical characteristics, identification information), the device has obtained the sound of glass breaking near the living room (e.g., interior environment information), and a blue car by slowly five minutes before the sound of glass breaking (e.g., exterior environment information).

At block 315, device 215-*a* receives identification information from at least one of a plurality of sources. The sources may be a database associated with house 215, a database associated with house 220, or a remote database 305. The device 215-*a* queries a local database associated with device 215-*a* (i.e., associated with house 215) and determines that none of the allowed and/or expected users associated with house 215 are tall women with blonde hair. The device may also request data (at block 315-*b*) from the database associated with house 220-*a*, as well as a shared database, and determine that none of the allowed and/or expected and/or expected visitors are tall women with blonde hair. In addition, none of the associated databases indicate that any of the associated users have a blue car. The device 215-*a* may request data (at block 315-*a*) from a remote database 305. In some examples, the remote database may automatically send out an alert and/or data to all devices enabled to receive identification and/or event data. The remote database may provide the device 215-*a* with a news report related to a series of burglaries that have occurred within 15 miles of house 215. In addition, the police have published a picture and description of the suspect: a tall woman with blonde hair. Device 215-*a* compares the data obtained from the sensor in block 310 to the identification data in block 315, and determine that the event occurring at house 215 is likely a burglary being committed by the suspect-at-large.

Device 215-*a* may also determine whether anyone (allowed and/or expected) is home. Determining occupancy may be performed using sensors inside and/or outside of the home that detect the presence of and identify who is located at the house. Based on whether someone is home or not, and/or based on a user preference or system settings, device 215-*a* may adjust an action (at block 330). If someone is determined to be home, the action may be different than if no one is determined to be home; for example, if someone is home, the device 215-*a* may only initiate a loud alarm to warn a user that someone unexpected or not allowed is in the home, but may not lock the doors in case the user needs to get away from the intruder. If no one is home, the device 215-*a* may increase the security settings, lock doors to hinder escape, alert the police, sound an alarm to scare the intruder, turn the sprinklers on to make identifying the intruder easier, etc.

In another example embodiment, house 215 may be occupied by a single man who is suspicious of any amount of detected activity or unknown visitors. The man has programmed his security systems and sensors to determine that any person and/or any vehicle which comes within a predetermined distance of his house is of the highest threat. The man at house 215 desires to be notified of every movement and every noise that is detected by device 215-*a*. In addition, the man desires to be notified of all people coming and going at his nearby neighbors houses, and he wants to be notified of all cars driving by that do not explicitly belong to someone in the neighborhood. The man's neighbors, however, do not want to receive every single alert and action transmitted from device 215-*a*, lest they be inundated with alerts and security action adjustment requests.

Thus, for example, the users at house 220 have set their system to receive all alerts and requests from devices at houses 225, 235, 240 and 245 as described in the previous example. With regard to alerts from house 215, the users at house 220 have programmed their system to only receive alerts and requests from house 215 if the device 220-*a* receives the alert and/or data and determines that the threat level, alert, and/or request satisfies a predetermined threshold. For example, device 220-*a* may transmit an alert or take an action if the data and/or request received from device 215-*a* is indicative of a crime, but device 220-*a* may disregard an alert received from device 215-*a* if device 220-*a* determines the alert is related only to a person walking through the neighborhood that is unlikely to pose a threat. Alternatively, device 220-*a* may transmit an alert or take an action if the data and/or request received from device 215-*a* is indicative of security alert (e.g., a security status change, an arm or disarm event), but may not transmit an alert or take action based only on sensor data alone. It should be understood that these are merely examples, and any security action may be contemplated.

In some examples, the actions may include predetermined settings based on the identification and/or the event. In other examples, the action may be programmed by or based on feedback or information relating to at least one of the users at house 215 and/or agreed upon by the networked group of users. For example, the networked group of users may collectively, separately, or each individually set a series of "threat levels," where each determined event is assigned to trigger or initiate a threat level with corresponding actions. A low threat level may correspond to an allowed and/or expected guest arriving at the house or an expected delivery of a package, whereas a high threat level may be associated with identifying a prowler, a security alarm state change, or sounds associated with a crime or dangerous situation (e.g., glass breaking, tires squealing). In some cases, a threat level of a first home may be based on or the same as a threat level at a second home. For example, a group of devices within a predetermined proximity may elect or be automatically configured so that if a first home enters a first threat level based on sensor data or a user-initiated action, at least some or all of the devices in the group may also enter the same threat level or an elevated threat level based at least in part on the threat level of the first home. This elevated threat level may trigger specified actions based on specified inputs and may be essentially more sensitive than a lower threat level (i.e., requiring less unrecognized or abnormal input to trigger an alert or an event as compared to a lower threat level).

In another example, the device 215-*a* may send an alert to a user that something is happening at the house. The alert may include information related to the data obtained from the sensor and/or the identification data. Thus the device 215-*a* may wait to take an action, or take a specific action, based on the user's response to the alert. In the meantime, the device 215-*a* may increase the frequency of obtaining data in case more data is needed for a decision or for future reference.

In another example, the device 215-*a* may send an alert and/or data (at block 355) to device 220-*a* to alert the users at house 220 that a burglary is occurring within a proximity (e.g., across the street, at house 215-*a*). Based on this information, the device 220-*a* may obtain sensor data, may receive identification data, may adjust actions, and/or may send alerts and data itself. In other examples, device 215-*a* may send a request to device 220-*a* to determine if anyone is home at house 220. Based on whether someone is home at house 220 or not, and based on comparing the data (at block 320), device 215-*a* may send a request to device 220-*a* to initiate a security action (at block 340), such as turning on a security camera at house 220 which has a view of house 215 across the street.

In another example, device 215-*a* may obtain data from a sensor, such as data relating to or showing cars passing by, people walking by, two cars associated with the house leaving the garage, etc. Device 215-*a* may also receive identification data related to people, vehicles, and cars associated with the neighborhood and/or networked devices. At some point, device 215-*a* may receive an alert from device 220-*a* that the daughter that lives in house 220 is not at home and she is expected to be home. Device 220-*a* may have adjusted security actions at house 220, and has sent a request to device 215-*a* to adjust security actions, such as increasing the frequency of capturing audio and video around the house, or querying other devices or databases for information related to the missing daughter. In some examples, this may allow a user associated with device 220-*a* to have a better chance of locating the daughter based on the additional querying and searching. In some examples, the databases or the information sources associated with device 215-*a* may be at least partially different from the databases or the information sources associated with device 220-*a*. Thus, by requesting that device 215-*a* initiate one or more actions, additional information can be gathered, compared, and evaluated within a predetermined period of time (e.g., less than one minute).

However, earlier, device 215-*a* obtained data that indicated the daughter was riding her bike down the street, and in fact, at the current time (or a past time), device 215-*a* is obtaining data indicating someone matching the daughter's description is located in the front yard of house 230. Thus, device 215-*a* sends an alert to device 220-*a* that the daughter is likely located at house 230, and thus does not adjust the security actions at house 215 based on the received data.

Figure 4:
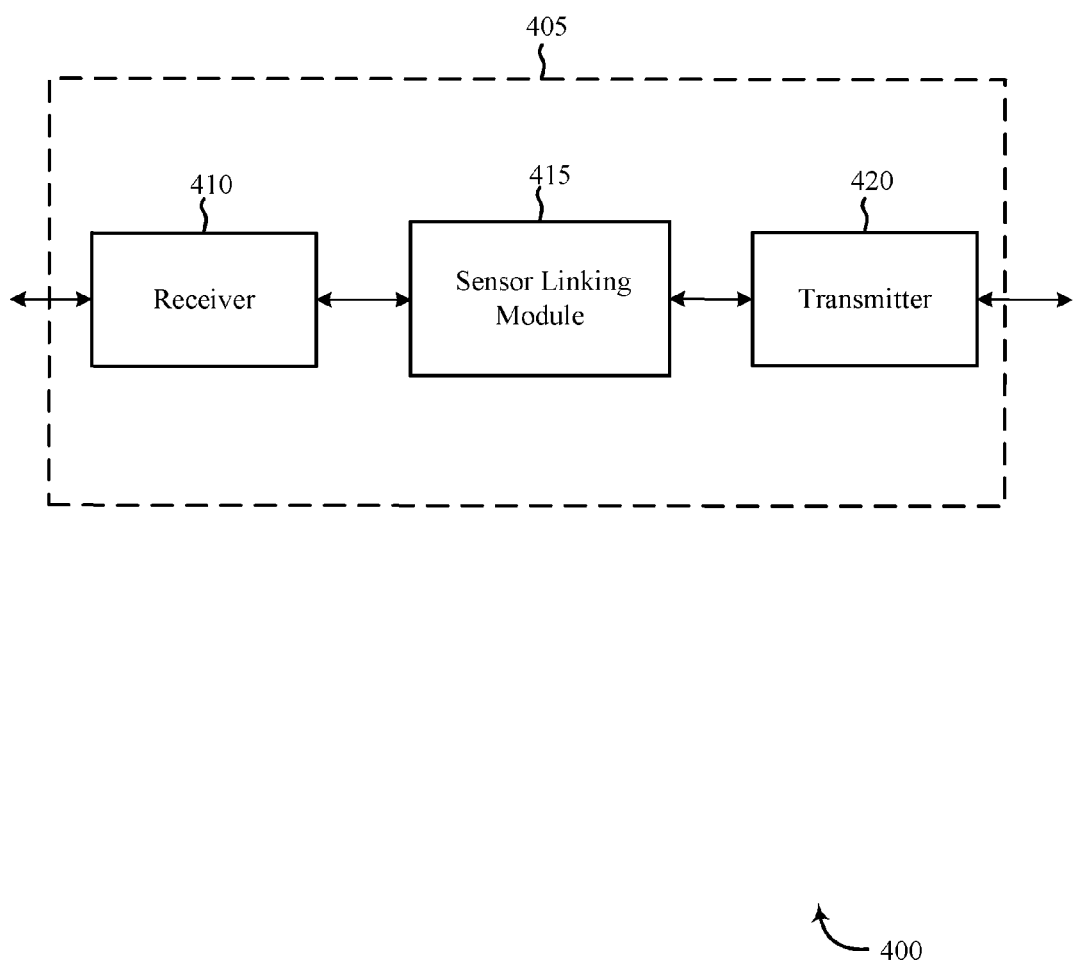
FIG. 4 shows a block diagram relating to a security and/or an automation system, in accordance with various aspects of this disclosure.

FIG. 4 shows a block diagram 400 of a device 405 for use in wireless communication, in accordance with various examples. The device 405 may be an example of one or more aspects of a control panel 105 described with reference to FIG. 1. It may also be an example of a sensor 110, local computing device 115 or 120, remote computing device 140 described with reference to FIG. 1. In the example where device 405 may be a sensor 110, sensor 110 may be a camera enabled to capture video and/or audio, in addition to other data as described previously. In some examples, device 405 may be an example device located at one of the example houses described with reference to FIG. 2. The device 405 may include a receiver 410, a sensor linking module 415, and/or a transmitter 420. The device 405 may also include a processor. Each of these components may be in communication with each other—directly and/or indirectly.

The components of device 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver 410 may receive information such as packets, user data, and/or control information associated with various information channels (e.g., control channels, data channels). The receiver 410 may be configured to receive data from sensor units 110, a local computing device 115 or 120, a remote computing device 140, a server 155, a third-party database, one or more components of communication system 100, as well as data relating to the identification of a person and/or an event, actions based on identification and/or user preferences, user profiles, data relating to home conditions and/or building features, data relating to environmental and geographic parameters and events, some combination, and/or other data and/or information. In some examples, information may be passed to the sensor linking module 415.

The sensor linking module 415 may be enabled to associate one device with at least one additional device in networked wireless communication. In one example, the devices may be linked based on a predetermined proximity, such as within a predetermined distance, geofenced area, neighborhood, subdivision, city block, city, county, state, street, association, etc. In another example, the devices may be automatically and initially linked based on automatic linking, but may be able to opt-out. For example, all houses which are located within a homeowners' association may be automatically networked.

In another embodiment, the devices may be linked based on opting-in (e.g., neighborhood watch, houses having a specific type of security system). In another example, the devices may be linked based on an association, such as an interest group (e.g., a book club), a community group (e.g., home owner association, school organization), or social network (e.g., Facebook, Twitter). In another example, the devices may be linked based on user input; for example, from a list of possible devices, a user may select which of the devices will receive data from the device at house 215 and/or which device will send data to the device at house 215. In other embodiments, the devices the user selects may be different based on the current situation; for example, in an emergency situation (e.g., determined to be an "emergency" based on an event classification), all of the houses which are within a predetermined radius of house 215 may be selected to receive data. In a non-emergency situation, however, only some of the houses may be selected to receive data; for example, the device at house 215 may recognize a delivery truck has dropped off a package at 215, and the device at house 215 sends a notification to other networked devices which have indicated they are waiting for the delivery truck.

The sensor linking module 415 may receive data from a plurality of sources and initiate any number of actions based on the data. In one example, sensor linking module 415 may receive data from a security camera or doorbell camera at example house 215 (e.g., sensor linking module 415 is associated with and/or located at example house 215). Some or all of the house that are networked may transmit and/or receive data from sensors and computing devices associated with any, some, or all of the networked locations. The data may be related to sounds and/or movement captured in front of the house; for example, people entering and exiting the house, people walking by, animals walking by, cars driving by, tree branches swaying the sound of wind and/or rain, the sound of a car colliding with another car, the sounds of shouting, etc. In another example, the sensor linking module 415 may receive data related to sounds and/or movement and/or events occurring inside the house—either by way of a communicatively linked sensor (e.g., another camera, a motion sensor, a microphone), or by way of data transmitted from an associated device in the house (e.g., smartphone, control panel) to the device 405. In some examples, the device 405 may be the control panel inside and receives data from a device outside of the house. In another example, sensor linking module 415 may receive data related to other devices associated in a networked and wireless communication with device 405. In this example, the houses located within the dotted link 205 from FIG. 2 may be part of a network, and may send and receive data to one another based on the descriptions provided herein.

The sensor linking module 415 may analyze data relating to an identification and/or an event and/or a user and/or other data, and perform operations relating to transmitted data to another networked device and/or taking an action in response to the data. In some examples, the sensor linking module 415 may perform operations and/or actions related to at least: identifying a person inside, outside, and/or proximate a location; identifying events inside, outside, and/or proximate a location; and/or initiating an adjustment, adjustments, or a stream of adjustments of a security feature and/or other user preference based at least in part on the receiving and analyzing.

In one example, device 405 may obtain data from a sensor located at house 215. The sensor may detect video, still images, sound, motion, temperature, vibration, infrared, frequencies, and/or any combination. For example, sensor linking module 415 may determine that a person has broken the glass of the front living room window of house 215 based on determining the presence of a person, the sound of glass breaking, the proximity of the person and the sound, and/or other data which indicates the front living room window being broken. In another example, sensor linking module 415 may determine that a person has broken the glass of a window of house 235, which is located across the street from house 215. In another example, sensor linking module 415 may determine that the front living room window of one of the houses has broken, but the presence of a person has not been detected, and thus the breaking of the glass may be for another reason, such as a misthrown baseball or a branch blowing in the wind. In some embodiments, obtained and/or received data may be stored in memory for future reference. In other embodiments, obtained and/or received data may trigger an adjustment or initiation of an action. In other embodiments, transmitter 420 may send the data to another device and/or send a notification and/or an alert and/or a command to another device based on the obtained data.

Sensor linking module 415 may also receive or obtain identification data related to a person and/or an event at house 215. In another example, sensor linking module 415 may receive or obtain identification data related to a person and/or an event at another location. For example, a video camera may obtain a facial scan of the person who broke the window at house 215, but may also receive or obtain data from a local or remote database, such as a criminal database containing news photos and/or mugshots. Sensor linking module 415 may then compare the data received (both locally and from a remote source) to make a determination as to who and what has occurred. In this example, sensor linking module 415 may determine that a person matching a recent news report about burglaries has been identified at house 215 and is identified as the person that broke the window, thus sensor linking module 415 may determine a burglary is about to occur.

Based on determining an identification of a person and/or an event, sensor linking module 415 may adjust a parameter associated with house 215 or take an action. The adjustment may be pre-programmed (e.g., a user profile which establishes actions and reactions), or may be based on artificial intelligence and learning based on previous events and actions both at the location and based on events and actions at other networked locations. Thus, in one example, an adjustment may be made automatically; however, in another example, the sensor linking module 415 may send an alert to a user to ask what the request adjustment should be based on the data and the comparison.

In addition, receiving and transmitting data and/or with regard to initiating an action at the associated location or at a networked location, sensor linking module 415 may further determine which other linked devices are part of the network and/or whether each device wants to, expects to, and/or is enabled to receive communications from device 405. Sensor linking module 415 may thus transmit data to at least one of the other linked devices which are identified as being part of the network.

In another example, such as when sensor module 415 detects the breaking of glass, but not the presence of a person, sensor linking module 415 may determine the event is not a burglary, but an accident, and thus the actions taken by sensor linking module 415 may be different based on determining a classification for the determined action.

Figure 5:
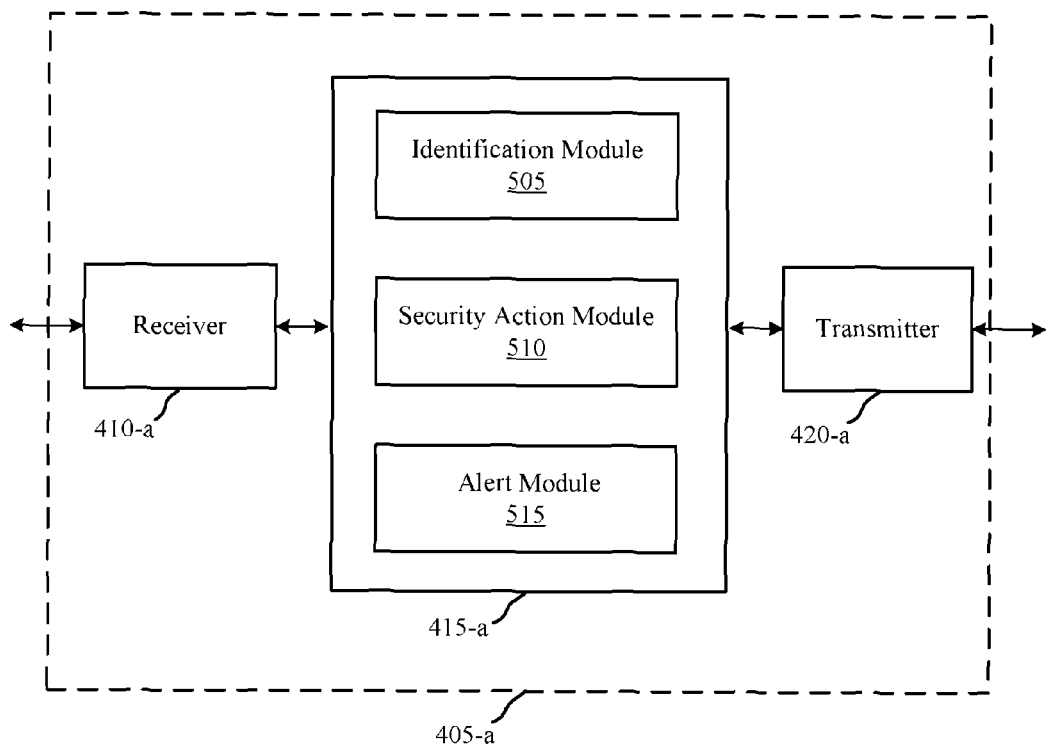
FIG. 5 shows a block diagram relating to a security and/or an automation system, in accordance with various aspects of this disclosure.

FIG. 5 shows a block diagram 500 of a device 405-*a* for use in wireless communication, in accordance with various examples. The device 405-*a* may be an example of one or more aspects of device 405 described with reference to FIG. 4. The device 405-*a* may also be an example of a control panel 105 described with reference to FIG. 1. It may also be an example of a sensor 110, local computing device 115 or 120, remote computing device 140 described with reference to FIG. 1. The device 405-*a* may include a receiver 410-*a*, a sensor linking module 415-*a*, and/or a transmitter 420-*a*, each of which may be an example of receiver 410, sensor linking module 415, and/or transmitter 420 described with reference to FIG. 4. Sensor linking module 415-*a* may also include an identification module 505, a security action module 510, and/or an alert module 515. The device 405-*a* may also include a processor. Each of these components may be in communication with each other—directly and/or indirectly.

The components of device 405-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver 410-*a* may receive information such as packets, user data, and/or control information associated with various information channels (e.g., control channels, data channels). The receiver 410-*a* may be configured to receive data from sensor units 110, a local computing device 115 or 120, a remote computing device 140, a server 155, a third-party database, one or more components of communication system 100, as well as data relating to the identification of a person and/or an event, actions based on identification and/or user preferences, user profiles, data relating to home conditions and/or building features, data relating to environmental and geographic parameters and events, some combination, and/or other data and/or information. In some examples, information may be passed to the sensor linking module 415-a.

Identification module 505 may receive and/or determine identification of a person, an object and/or an event. In some examples, identification module 505 obtains data within a predetermined proximity of the device. Data may include pictures, video, audio, sub audio, vibrations, motion, wind, rain, snow, ice, colors, fabrics, fingerprints, retinal scans, voice capture, identification numbers, changes in temperature, quick response (QR) code data, barcode data, radio frequency identification data (RFID), wireless device identification data, etc. Using similar methods, the identification module 505 may determine whether a person is located at or within the house.

In addition, identification module 505 may receive and/or determine data related to identifying a person, an animal, an object and/or an event. In some examples, the identification data may be compared to the data received and/or determined as described above in order to determine a specific identification. Identification data may be stored in a device and/or in a database enabled to be accessed by the device, for example, a communal database shared by the networked devices. In other examples, identification data may be obtained and/or received from a remote source and/or a third-party database such as a news report, a flyer, a radio broadcast, an all-points bulletin, a missing child database, a criminal database, a database of user profiles associated with a networked group of users, etc.

Security action module 510 may adjust security actions or other automation actions based on identification of people, events, objects, and/or animals. For example, in examples involving a lighting system, adjustments may be to the lighting system and any component(s) thereof. Other adjustments may include, for example, adjustments to a television or system of televisions, a music system, relatedly a home theater system, a thermostat system, a humidifier system, and/or a water system, among others.

Other adjustments may be security actions and may include: locking and/or unlocking doors and/or windows; turning on or turning off internal and/or external lights; turning on, turning off, turning the volume up, turning the volume down on audio and/or video broadcasts; deactivating or activating sensors which indicate a door and/or window has been opened or closed; deactivating or activating alarms and sirens; increasing the frequency audio and/or video is captured at a security device; turning on or off electricity and/or circuit breakers and/or water lines; sending an alert to a user, a remote user, a networked device, law enforcement, a news source, an associated group, and the like.

In some examples, the security action adjustment may be automatic and based on preprogrammed preferences. In other examples, the security action adjustment may be based on determining whether or not a person is located at the first and/or a second location. In some examples, the security action adjustment may be dynamic and/or based on user input in real time (e.g., within 5 minutes of a user receiving an alert). In other examples, the security action adjustment may be based on who has been identified as being located at a second location and/or based on an event at a second location (e.g., a burglary down the street).

Alert module 515 may transmit identification and event data to a user associated with the device at example house 215. In some examples, the alert may be sent to a control panel inside or outside of the house, a portable electronic device such as a smartphone, tablet, smartwatch, the alert may be broadcast through speakers inside or outside of the house and/or on a television screen and/or monitor. In some examples, the alert may similarly transmitted and broadcast to at least one other wireless networked device, such as the device located at house 245. In other examples, the alert may be sent to law enforcement, a news source, a share group database, and the like.

In one example, the alert module 515 may send an alert to the user associated with the device that someone is determined to be present at the house and whether the person is identified, and if so, who the person is identified to be, and/or whether the person is allowed and/or expected. In other examples, the device may send an alert that a person is determined to be present at the house but the person is not identified. In other examples, the alert module 515 may send the user an alert which indicates an event has or is occurring; for example, a family member arriving home, a package being delivered, someone breaking in, a car accident in the front yard, a kidnapping, a pet running away, etc. Based on the alert, the user may be presented with options. The options may be to select a security action adjustment based on preprogrammed security action adjustment selections, or may be able to manually override automatic or scheduled security action adjustments. In some cases, the system may perform an automatic security action adjustment if a user does not provide input or a contrary instruction within a predetermined time (e.g., the system automatically arms the system and locks the doors if the user does not indicate otherwise).

In another example, the alert module 515 may alert other networked devices about the presence or non-presence of a person and/or the occurrence or non-occurrence of an event. In one example, the alert sent to a networked device may be informational and contain data obtained at the first location. In one embodiment, the alert sent from the first location may be to request the device at the second location to adjust a security action or take another action. For example, the alert module 515 may receive an indication of the sound of glass breaking at house 215, and thus transmit an alert to a device associated with house 220 regarding a notification of the glass break. The device associated with house 220 may have a preprogrammed action to initiate and/or adjust at house 220 based on data and alerts received from house 215.

In other examples, the alert module 515 may send a request to a device at a second location to determine occupancy at the second location. In some examples, an identification module associated with a device at the second location may make the occupancy determination based on the alert received from the first device. In another example, the alert module 515 may send a request to the device at the second location to adjust a security action at the second location. In some cases, the adjustment of the security action at the second location will be effectuated based on receiving the alert. In other cases, however, the adjustment of the security action may be based on a determination of occupancy at the second location and/or based on user preferences or input at the first and/or second locations.

The transmitter 420-a may transmit the one or more signals received from other components of the device 405-a. The transmitter 420-a may transmit data relating to, for example, adjusting a home environment, including data relating to adjusting a device 130, including in some examples data relating to adjusting a component of a lighting system. In some examples, the transmitter 420-a may be collocated with the receiver 410-a in a transceiver module.

Figure 6:
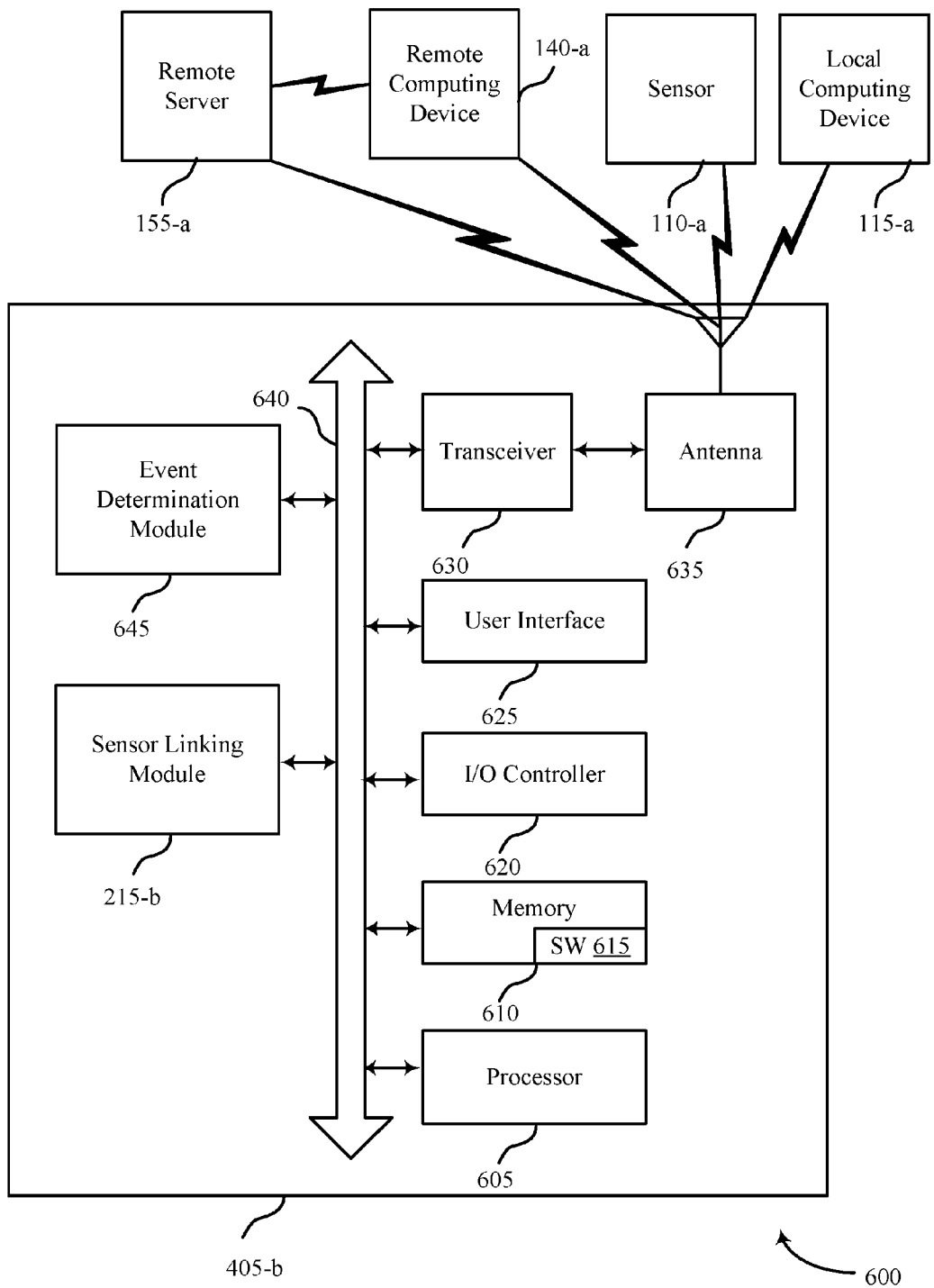
FIG. 6 shows a block diagram of an apparatus relating to a security and/or an automation system, in accordance with various aspects of this disclosure.

FIG. 6 shows a system 600 for networked security cameras and related automation, in accordance with various examples. System 600 may include a device 405-b, which may be an example of the control panel 105, local computing devices 115 and/or 120, remote computing device 140, and/or sensor 110 described with reference to FIG. The device 405-b may also be an example of one or more aspects of device 405 and/or 405-a of FIGS. 4 and 5.

Device 405-b may also include components for bi-directional voice and data communications including components for transmitting communications and components for receiving communications. For example, device 405-b may communicate bi-directionally with one or more of local computing devices 115-a, one or more sensors 110-a, one or more of remote computing devices 140-a, and/or remote server 155-a. This bi-directional communication may be direct (e.g., device 405-b communicating directly with remote server 155-a) or indirect (e.g., device 405-b communicating indirectly with remote computing device 140-a through remote server 155-a).

Device 405-b may also include a processor 605, and memory 610 (including software/firmware code (SW) 615), an input/output controller module 620, a user interface 625, a transceiver 630, and one or more antennas 635 each of which may communicate—directly or indirectly—with one another (e.g., via one or more buses 640). The transceiver 630 may communicate bi-directionally—via the one or more antennas 635, wired links, and/or wireless links—with one or more networks or remote devices as described above. For example, the transceiver 630 may communicate bi-directionally with one or more of local computing devices 115-a, one or more sensors 110-a, one or more of remote computing devices 140-a, and/or remote server 155-a. The transceiver 630 may include a modem to modulate the packets and provide the modulated packets to the one or more antennas 635 for transmission, and to demodulate packets received from the one or more antenna 635. While a device (e.g., 405-b) may include a single antenna 635, the device may also have multiple antennas 635 capable of concurrently transmitting or receiving multiple wired and/or wireless transmissions. In some examples, one element of device 405-b (e.g., one or more antennas 635, transceiver 630) may provide a direct connection to a remote server 155-a via a direct network link to the Internet via a POP (point of presence). In some examples, one element of device 405-b (e.g., one or more antennas 635, transceiver 630) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 635 and/or transceiver 630 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some examples, each antenna 635 may receive signals or information specific and/or exclusive to itself. In other examples, each antenna 635 may receive signals or information not specific or exclusive to itself.

In some examples, one or more sensors 110 (e.g., motion, proximity, smoke, light, glass break, door, window, carbon monoxide, and/or another sensor) may connect to some element of system 600 via a network using one or more wired and/or wireless connections.

In some examples, the user interface 625 may include an audio device, such as an external speaker system, an external display device such as a display screen, and/or an input device (e.g., remote control device interfaced with the user interface 625 directly and/or through I/O controller 620).

One or more buses 640 may allow data communication between one or more elements of device 405-b (e.g., processor 605, memory 610, I/O controller 620, user interface 625).

The memory 610 may include random access memory (RAM), read only memory (ROM), flash RAM, and/or other types. The memory 610 may store computer-readable, computer-executable software/firmware code 615 including instructions that, when executed, cause the processor 605 to perform various functions described in this disclosure (e.g., obtain data at a sensor, receive identification data, compare data, adjust security actions, transmit data). Alternatively, the software/firmware code 615 may not be directly executable by the processor 605 but may cause a computer (e.g., when compiled and executed) to perform functions described herein. Alternatively, the computer-readable, computer-executable software/firmware code 615 may not be directly executable by the processor 605 but may be configured to cause a computer (e.g., when compiled and executed) to perform functions described herein. The processor 605 may include an intelligent hardware device, e.g., a central processing unit (CPU), a microcontroller, an application-specific integrated circuit (ASIC), etc.

In some examples, the memory 610 can contain, among other things, the Basic Input-Output system (BIOS) which may control basic hardware and/or software operation such as the interaction with peripheral components or devices. For example, the sensor linking module 215-b to implement the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver 630, one or more antennas 635).

Many other devices and/or subsystems may be connected to, or may be included as, one or more elements of system 600 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some examples, all of the elements shown in FIG. 6 need not be present to practice the present systems and methods. The devices and subsystems may be interconnected in different ways from that shown in FIG. 6. In some examples, an aspect of some operation of a system, such as that shown in FIG. 6, may be readily known in the art and are not discussed in detail in this application. Code to implement the present disclosure may be stored in a non-transitory computer-readable medium such as one or more of system memory 610 or other memory. The operating system provided on I/O controller module 620 may be iOS®, ANDROID®, MS-DOS®, MS-WINDOWS®, OS/2®, UNIX®, LINUX®, or another known operating system.

The transceiver 630 may include a modem configured to modulate the packets and provide the modulated packets to the antennas 635 for transmission and/or to demodulate packets received from the antennas 635. While the control panel and/or device and/or sensor (e.g., 405-b) may include a single antenna 635, the control panel and/or device and/or sensor (e.g., 405-b) may have multiple antennas 635 capable of concurrently transmitting and/or receiving multiple wireless transmissions.

The device 405-b may include a sensor linking module 215-a, which may perform the functions described above for the sensor linking module 415 of devices 405 and 405-a of FIGS. 4 and 5, respectively. The device 405-b may also include an event determination module 645. Event determination module 645 may compare data received with elements pre-associated with a plurality of known events to determine whether an event is occurring and classify what type of event is occurring (e.g., user returning home, delivery of a package, car accident in the front yard, burglary, fire, flood). In other examples, event determination module 645 may extrapolate to determine what and when an event is occurring based on data that is not pre-associated with an event. For example, the event determination module 645 may not have the event of a "burglary" stored, but may know about the sound of glass breaking and the sound of heavier footsteps of a person exiting the house as opposed to entering the house. The event determination module 645 may thus use computer learning techniques and extrapolation, as well as considering other external data, to determine that these data indicate a burglary.

Based on the determination of the event at one location, the device may query another device for additional data to make further determinations. For example, if the device determines the front living room glass has broken, the device may query the other networked devices for audio and/or video data within a predetermined time period, in order to determine if the glass breaking is a burglary or an accident.

Figure 7:
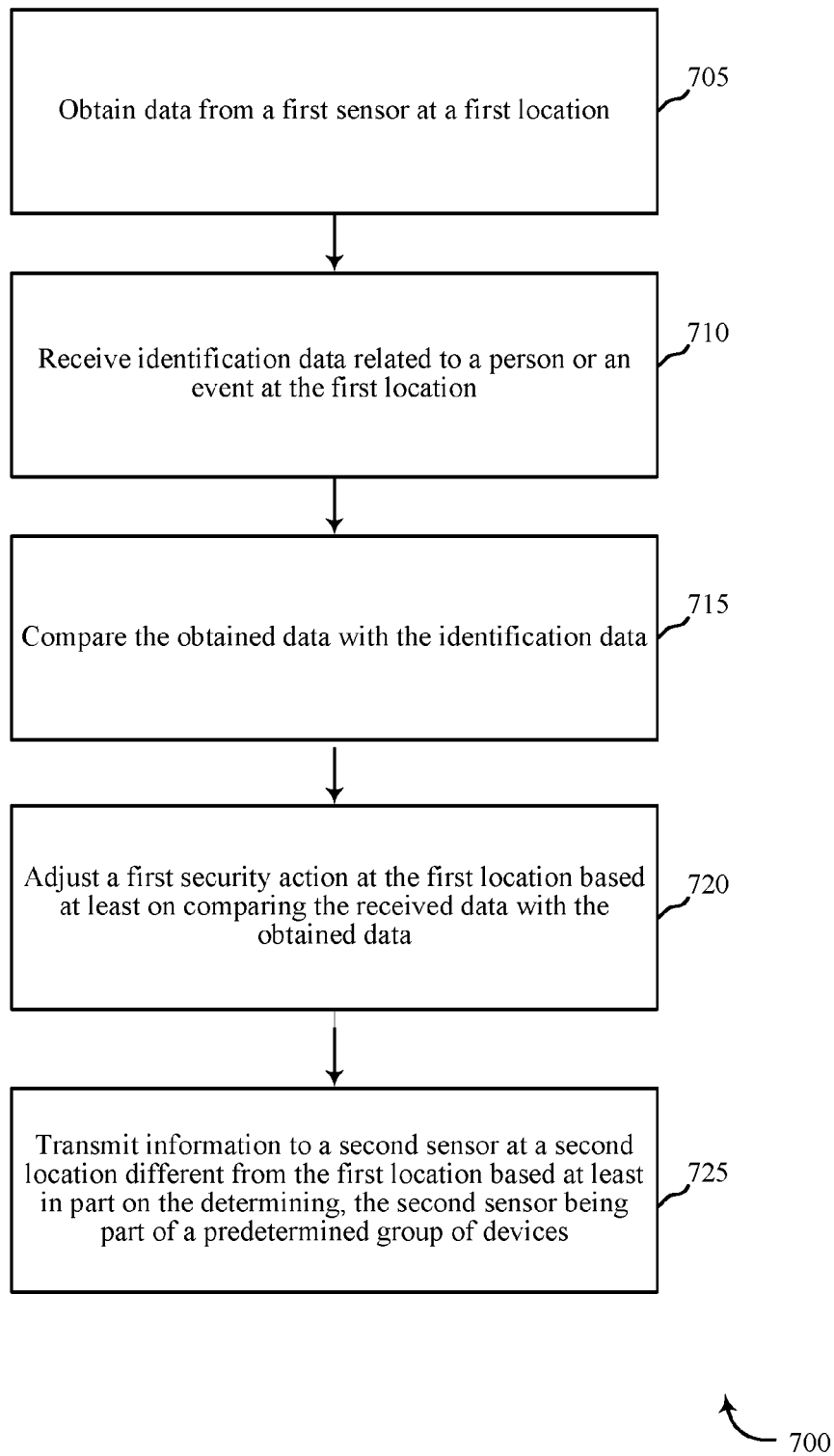
FIG. 7 is a flow chart illustrating an example of a method relating to a security and/or an automation system, in accordance with various aspects of this disclosure.

FIG. 7 is a flow chart illustrating an example of a method 700 for networked security cameras and related automation, in accordance with various aspects of the present disclosure. For example, the method 700 is described below with reference to aspects of one or more of the devices 405 described with reference to FIG. 4, and/or aspects of one or more of the devices described with reference to FIG. 5, and/or aspects of one or more of the sensors 110 described with referenced to FIG. 1. In some examples, a process may execute one or more sets of codes to control the functional elements of device 405 and/or device 405-a and/or sensor 110 to perform the functions described below. Additionally or alternatively, the processor may perform one or more of the functions described below using special-purpose hardware.

At block 705, the method 700 may include obtaining data from a first sensor at a first location. For example, an image capture device, such as a camera, may be positioned to capture pictures, audio, and videos in a location, and may detect motion occurring within a predetermined distance from the image capture device. Presence may also be detected through sound captured at a microphone or other sound capture device. In other examples, presence may be determined by way of pressure detection (e.g., pressure sensitive floors), infrared detection, temperature differences, vibration detection, etc. In one example, the detection of movement, sound, vibrations, etc. may be caused by a person or may be caused by a nearby moving vehicle. In other examples, the motion may be caused by factors such as animals or tree branches blowing in the wind. The operation(s) at block 705 may be performed using the sensor linking module 415 and/or the identification module 505 described with reference to FIGS. 4 and 5, respectively.

At block 710, the method 700 may include receiving identification data related to a person or an event at the first location. Identification data may be related to a person's physical characteristics and/or anatomy, to information a user knows, actions, interactions with devices or areas or locations, environmental and temporal data, electronic data and information received from devices associated with a user, situational data, and the like. Identification data may be retrieved from a local database, a user profile, and/or sensor data relating to one or more locations (e.g., home, street, car, location of mobile device). Identification data may also be retrieved from a third-party database such as a news report, a flyer, a radio broadcast, an all-points bulletin, a missing child database, a criminal database, a database of user profiles associated with a networked group of users, etc. In addition identification data may not be related to a person, but an animal and/or a vehicle. Identification data may also be related to an event. For example, the sound of glass breaking, metal crunching, tires squealing, screaming, etc., may indicate a robbery, a crash, a kidnapping, an accident, or another determined event, etc. The operation(s) at block 710 may be performed using the sensor linking module 415 and/or the identification module 505 and/or the event determination module 645 described with reference to FIGS. 4, 5, and 6 respectively.

At block 715, the method 700 may include comparing the obtained data with the identification data. Based on the data obtained by the first device, and the identification data received, the device may compare the data to make a determination. For example, if it is detected that glass is breaking, but there is no person detected within a predetermined distance of the glass at the time of the breaking (e.g., within a five foot radius), the device may determine the glass broke due to a branch hitting the glass or a baseball hitting the glass. On the other hand, if the sound of glass breaking is obtained, as well as the presence of a person, and the person has characteristics which match a news report related to specific person breaking into houses nearby or if the person is unknown or cannot be recognized, the device may determine this is an intruder breaking into this house. The operation(s) at block 715 may be performed using the sensor linking module 415 and/or the identification module 505 and/or the event determination module 645 described with reference to FIGS. 4, 5, and 6 respectively.

At block 720, the method 700 may include adjusting a first security action at the first location based at least on comparing the received data with the obtained data. For example, the security at the ingress and egress points may increase (e.g., doors and/or windows lock, curtains close, lights and/or sounds activate, alarms activate, law enforcement is notified, other networked users are notified, sprinklers are activated) or decrease (e.g., security system turned off, blinds raise, doors unlock). The operation(s) at block 720 may be performed using the sensor linking module 415 and/or the security action module 510 described with reference to FIGS. 4 and 5, respectively.

At block 725, the method 700 may include transmitting information to a second sensor at a second location different from the first location based at least in part on the determining, the second sensor being part of a predetermined group of devices. There may be multiple devices networked in wireless communication with one another, where the devices are not located at the same location (e.g., not at the same house, but in the same neighborhood; not on the same floor, but in the same high-rise office building). Based on determining the identification of a person or event, the first device may share data related to the identification with another networked device. In other examples, the first device may share data with law enforcement, news sources, security companies, delivery companies, etc. The operation(s) at block 725 may be performed using the sensor linking module 415 and/or the security action module 510 and/or the alert module 515 described with reference to FIGS. 4 and 5, respectively.

Thus, the method 700 may provide for networked security cameras and related automation. It should be noted that the method 700 is just one implementation and that the operations of the method 700 may be rearranged or otherwise modified such that other implementations are possible.

Figure 8:
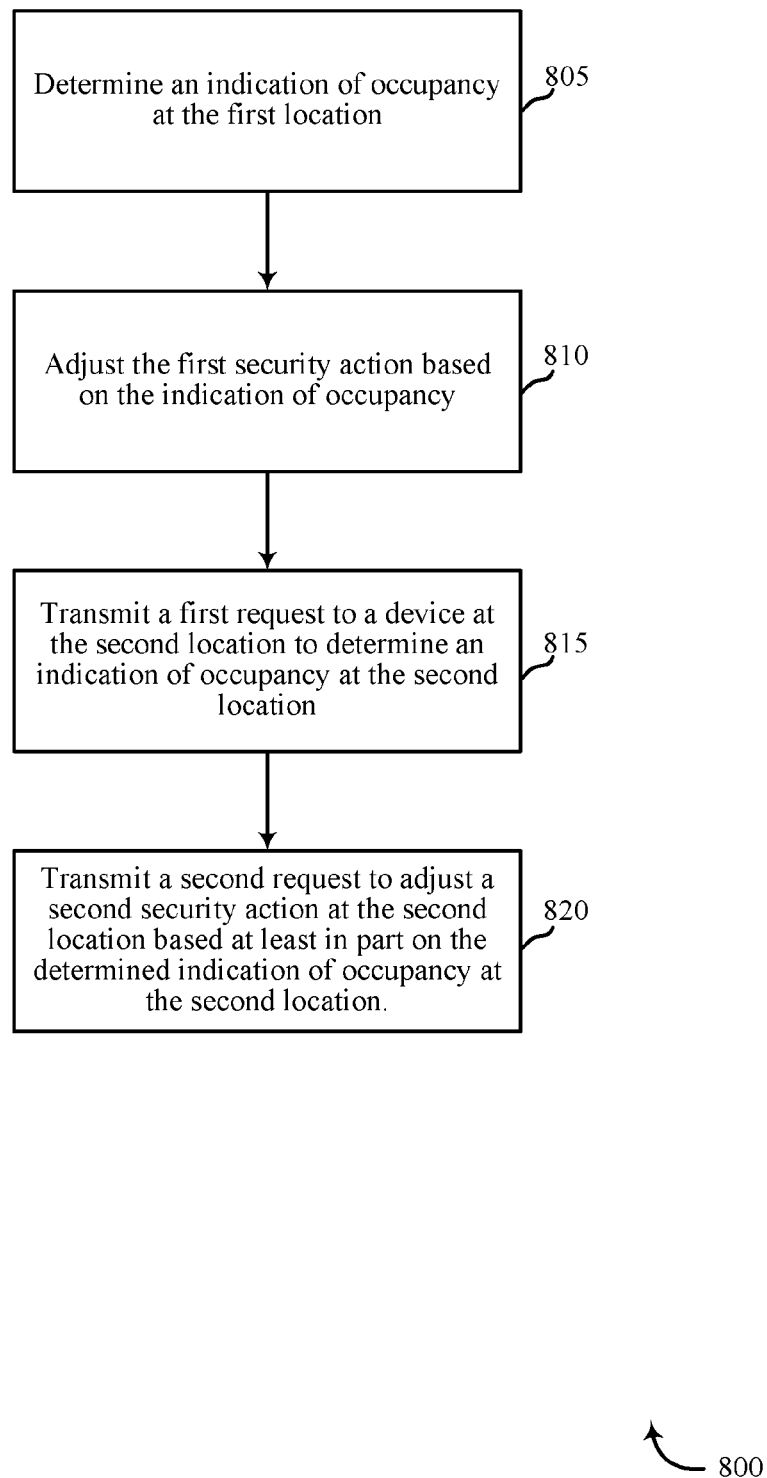
FIG. 8 is a flow chart illustrating an example of a method relating to a security and/or an automation system, in accordance with various aspects of this disclosure.

FIG. 8 is a flow chart illustrating an example of a method 800 for networked security cameras and related automation, in accordance with various aspects of the present disclosure. For example, the method 800 is described below with reference to aspects of one or more of the devices 405 described with reference to FIG. 4, and/or aspects of one or more of the devices described with reference to FIG. 5, and/or aspects of one or more of the sensors 110 described with referenced to FIG. 1. In some examples, a process may execute one or more sets of codes to control the functional elements of device 405 and/or device 405-*a* and/or sensor 110 to perform the functions described below. Additionally or alternatively, the processor may perform one or more of the functions described below using special-purpose hardware.

At block 805, the method 800 may include determining an indication of occupancy at the first location. For example, determining an indication of occupancy at the first location may include determining if an known or recognized user has arrived at home by way of presence detection and identification techniques. The techniques may include: detection by motion sensor, a microphone detecting sound, sensors detecting vibrations, facial recognition, voice recognition, fingerprint scan, retinal scan, identification by way of wireless communications with a portable electronic device associated with a user, a digital input at an input device (e.g., personal identification number), and the like. Similar techniques may be used to determine the presence of any person, even if the person is not considered an allowed and/or expected user. The operation(s) at block 805 may be performed using the sensor linking module 415 and/or the identification module 505 and/or the event determination module 645 described with reference to FIGS. 4, 5, and 6 respectively.

At block 810, the method 800 may include adjusting the first security action based on the indication of occupancy. In some examples, as previously described, a security action may be determined and/or activated and/or initiated based on the determination of an event or identification (or non-identification) of a person and/or object. For example, the security at the ingress and egress points may increase (e.g., doors and/or windows lock, curtains close, lights and/or sounds activate, alarms activate, law enforcement is notified, other networked users are notified, sprinklers are activated) regardless if an user is home or not. In other examples, however, the security action may be based on the fact a user was determined to be home or not or that a structure has been determined to be occupied or not. For example, in the case that a user is determined to be home, the security action may be to notify the user that someone suspicious is outside, or that a flagged event is happening outside (e.g., a stolen car is identified as driving by). Because the user is home, the alert may be all that is desired and/or sufficient. However, if the user is determined not to be home, the security actions may be different. Because the user is not present to deal with the situation him or herself, the security actions may make the house more secure. In other examples, the security actions may activate instruments in the home to make it appear as if a user is home, even if he or she is not. For example, turning on lights or music. The operation(s) at block 810 may be performed using the sensor linking module 415 and/or the security action module 510 described with reference to FIGS. 4 and 5, respectively.

At block 815, the method 800 may transmitting a first request to a device at the second location to determine an indication of occupancy at the second location. As described previously, multiple devices may be networked together in wireless communication (e.g., a neighborhood, a group, a community network). In one example, a device may determine that a person identified from the news as stealing a car is located at house 215. The device associated with house 215 may be programmed to warn a user at the house within a predetermined area or proximity, such as a home down the street (e.g., house 225), and thus sends a communication or an instruction to the device associated with house 225 to determine whether anyone is home at house 225. The operation(s) at block 815 may be performed using the sensor linking module 415 and/or the security action module 510 and/or the alert module 515 described with reference to FIGS. 4 and 5, respectively.

At block 820, the method 800 may include transmitting a second request to adjust a second security action at the second location based at least in part on the determined indication of occupancy at the second location. Based on determining whether a person is home or not at house 225, the device associated with house 215 may send a request to the device at house 225 to adjust a security action at house 225. The security actions may be similar to those described previously. The operation(s) at block 820 may be performed using the sensor linking module 415 and/or the security action module 510 and/or the alert module 515 described with reference to FIGS. 4 and 5, respectively.

Thus, the method 800 may provide for networked security cameras and related automation. It should be noted that the method 800 is just one implementation and that the operations of the method 800 may be rearranged or otherwise modified such that other implementations are possible.

In some examples, aspects from two or more of the methods 700 and 800 may be combined and/or separated. It should be noted that the methods 700 and 800 are just example implementations, and that the operations of the methods 700 and 800 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some examples, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various examples have been described and/or illustrated here in the context of fully functional computing systems, one or more of these exemplary examples may be distributed as a program product in a variety of forms, regardless of the particular type of computer-readable media used to actually carry out the distribution. The examples disclosed herein may also be implemented using software modules that perform certain tasks. These software modules may include script, batch, or other executable files that may be stored on a computer-readable storage medium or in a computing system. In some examples, these software modules may permit and/or instruct a computing system to perform one or more of the exemplary examples disclosed here.

This description, for purposes of explanation, has been described with reference to specific examples. The illustrative discussions above, however, are not intended to be exhaustive or limit the present systems and methods to the precise forms discussed. Many modifications and variations are possible in view of the above teachings. The examples were chosen and described in order to explain the principles of the present systems and methods and their practical applications, to enable others skilled in the art to utilize the present systems, apparatus, and methods and various examples with various modifications as may be suited to the particular use contemplated.

What is claimed is:

1. A method for security and/or automation systems, comprising:
   obtaining data from a first sensor at a first location;
   receiving identification data related to a person or an event at the first location;
   comparing the obtained data with the identification data;
   adjusting a first security action at the first location based at least in part on comparing the received data with the obtained data; and
   transmitting information to a second sensor at a second location different from the first location based at least in part on the determining, the second sensor being part of a predetermined group of devices.

2. The method of claim 1, further comprising:
   detecting an event at the first location based on the obtained data, the received identification data, or both;
   classifying the event at the first location based on the detecting; and
   sending a request to a second device at the second location based at least in part on the classification.

3. The method of claim 1, wherein adjusting comprises:
   sending a request to a device at the second location to obtain data.

4. The method of claim 1, further comprising:
   determining an indication of occupancy at the first location; and
   adjusting the first security action based on the indication of occupancy.

5. The method of claim 4, further comprising:
   transmitting a first request to a device at the second location to determine an indication of occupancy at the second location; and
   transmitting a second request to adjust a second security action at the second location based at least in part on the determined indication of occupancy at the second location.

6. The method of claim 1, further comprising:
   sending a command to adjust a second security action at the second location based at least in part on the comparing at the first location.

7. The method of claim 1, wherein adjusting comprises:
   adjusting the first security action at the first location based at least in part on a user profile associated with the first location.

8. The method of claim 7, further comprising:
   transmitting an instruction to variably adjust a second security action at the second location based at least in part on the adjustment of the first security action at the first location.

9. The method of claim 1, wherein the transmitted information comprises:
   transmitting an instruction to variably adjust a second security action at the second location based at least in part on a user profile associated with the second location.

10. The method of claim 1, further comprising:
    receiving identification data from a remote source; and
    determining an identity of the person based at least in part on the received identification data from the remote source and the comparing.

11. The method of claim 1, wherein receiving data comprises:
    receiving identification data from a database associated with the predetermined group.

12. The method of claim 1, further comprising:
    identifying the predetermined group of devices based on a user input.

13. The method of claim 1, further comprising:
    defining the predetermined group of devices based at least in part on a geographic proximity of the first location to the second location, wherein the first location and the second location are in different physical structures.

14. The method of claim 1, wherein adjusting the first security action comprises:
    increasing a frequency of obtaining audio data or visual data.

15. The method of claim 1, wherein adjusting the first security action comprises:
    activating an internal light, or an external light, or an internal audio source, or an external audio source, or a lock, or some combination thereof.

16. The method of claim 1, further comprising:
    sending an alert to a user device associated with the first location based at least in part on the received data;
    receiving an indication from the user based on the sent alert; and
    adjusting a security action at the first location based at least in part on the received indication.

17. An apparatus for security and/or automation systems, comprising:
    a processor;
    memory in electronic communication with the processor; and
    instructions stored in the memory, the instructions being executable by the processor to:
    obtain data from a first sensor at a first location;
    receive identification data related to a person or an event at the first location;
    compare the obtained data with the identification data;
    adjust a first security action at the first location based at least in part on comparing the received data with the obtained data; and
    transmit information to a second sensor at a second location different from the first location based at least in part on the determining, the second sensor being part of a predetermined group of devices.

18. The apparatus of claim 17, wherein the instructions are further executable by the processor to:
    detect an event at the first location based on the obtained data, the received identification data, or both;
    classify the event at the first location based on the detecting; and
    send a request to a second device at the second location based at least in part on the classification.

19. The apparatus of claim 17, wherein the instructions are further executable by the processor to:
    determine an indication of occupancy at the first location; and
    adjust the first security action based on the indication of occupancy.

20. A non-transitory computer-readable medium storing computer-executable code, the code executable by a processor to:
    obtain data from a first sensor at a first location;
    receive identification data related to a person or an event at the first location;
    compare the obtained data with the identification data;
    adjust a first security action at the first location based at least in part on comparing the received data with the obtained data; and transmit information to a second sensor at a second location different from the first location based at least in part on the determining, the second sensor being part of a predetermined group of devices.

\* \* \* \* \*